United States Patent [19]
McCord

[11] 3,931,691
[45] Jan. 13, 1976

[54] DOOR DEVICE

[75] Inventor: Thomas J. McCord, Harrisonville, Mo.

[73] Assignee: The Raymond Lee Organization, Inc., New York, N.Y. ; a part interest

[22] Filed: Jan. 11, 1974

[21] Appl. No.: 432,761

[52] U.S. Cl. .................... 43/61; 49/394; 292/259
[51] Int. Cl.² ........................................ A01M 23/18
[58] Field of Search ............ 43/61; 292/259; 49/394

[56]  References Cited
UNITED STATES PATENTS
1,554,079   9/1925   Frick ........................................ 43/61
2,087,646   7/1937   Houghton .............................. 43/61

Primary Examiner—Louis G. Mancene
Assistant Examiner—Daniel J. Leach
Attorney, Agent, or Firm—Daniel Jay Tick

[57]  ABSTRACT

A door device comprises a door hingedly affixed to a housing at the top of the door for covering the opening thereof. A door locking device is provided on the housing at the door and comprises a pair of parallel guide slots each formed through the housing on a corresponding side of the opening. A slide rod is slidably mounted in the slots for movement up and down on one side of the door and extend across the opening. Thus, when the door is open it supports the slide rod and when it closes, the slide rod slides down and bars the door.

3 Claims, 10 Drawing Figures

DOOR DEVICE

DESCRIPTION OF THE INVENTION

The present invention relates to a door device.

Objects of the invention are to provide a door device, and more specifically, a door and door locking device of simple structure, which is inexpensive in manufacture, and which functions with efficiency, effectiveness, and reliability to automatically lock a door.

In order that the invention may be readily carried into effect, it will now be described with reference to the accompanying drawing, wherein.

In the FIGS., the same components are identified by the same reference numerals.

The door device of the invention comprises a housing 1 having an opening 2 (FIGS. 1 to 5). In the embodiment of FIGS. 6 to 10, a housing 1' has an opening 2'.

Figure 1:
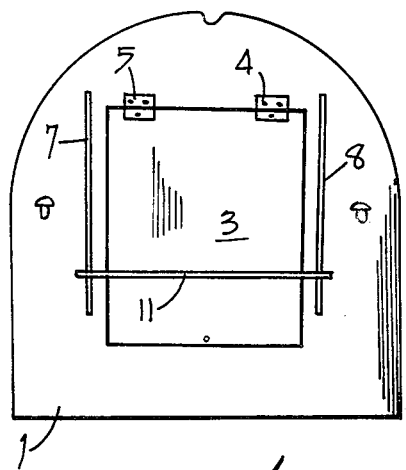
FIG. 1 is a front view of an embodiment of the door device of the invention in closed, locked condition.
Figures 2, 3:
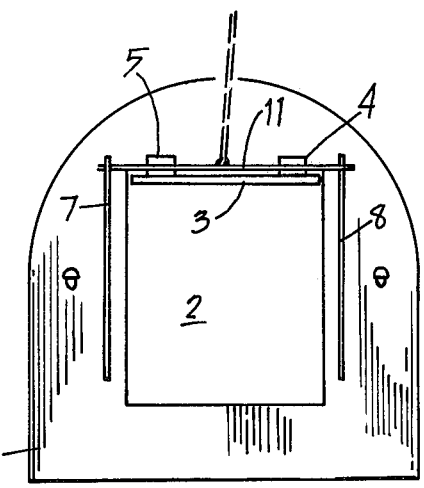
FIG. 2 is a side view of the door device of FIG. 1.
FIG. 3 is a view of the door device of FIG. 1 in open condition.
Figure 4:
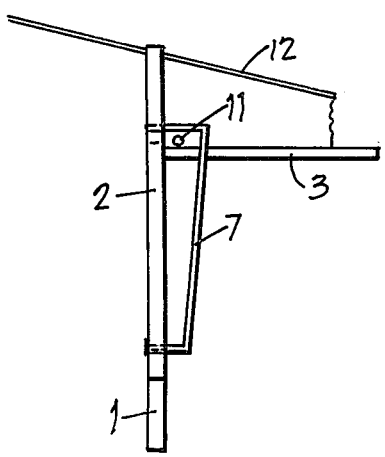
FIG. 4 is a side view of the door device of FIG. 3.
Figure 5:
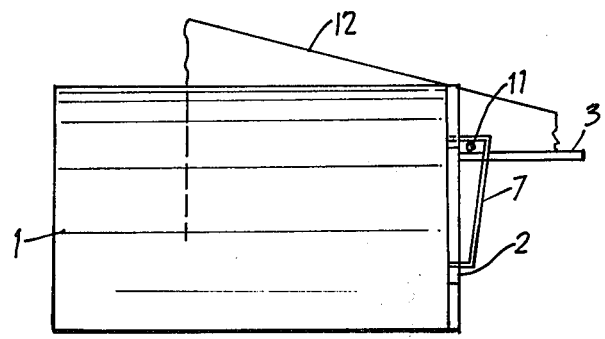
FIG. 5 is a side view of an animal trap embodying the door device of FIGS. 1 to 4, the door being in open condition.
Figure 10:
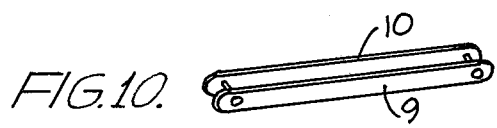
FIG. 10 is a schematic diagram of the locking member of the door device of FIGS. 6 to 9.
Figure 6:
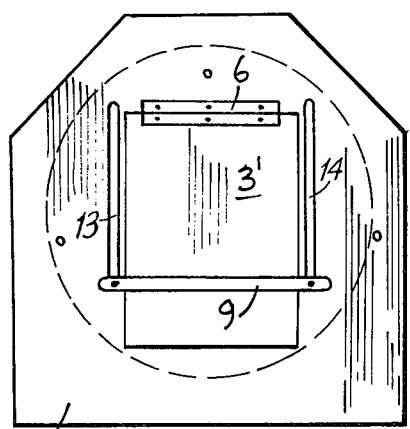
FIG. 6 is a front view of another embodiment of a door device of the invention in closed, locked condition.
Figure 7:
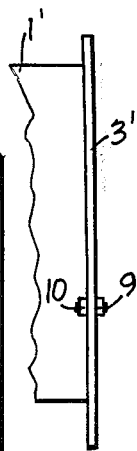
FIG. 7 is a side view of the door device of FIG. 6.
Figure 8:
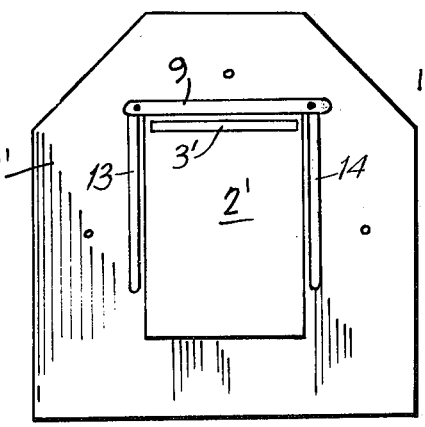
FIG. 8 is a front view of the door device of FIG. 6 in open condition.
Figure 9:
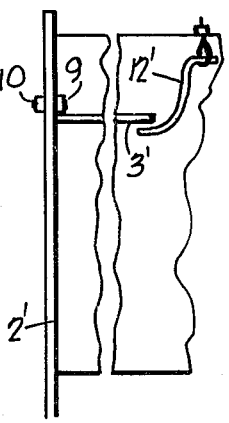
FIG. 9 is a side view of the door device of FIG. 8.

The door 3 is hingedly affixed to the housing 1 for covering the opening 2 thereof (FIGS. 1 to 5). A door 3' is hingedly affixed to the housing 1' for covering the opening 2' thereof (FIGS. 6 to 9). The door is affixed to the housing at the top of the door, as shown in the FIGS. Any suitable hinge arrangement may be utilized such as, for example, a pair of hinges 4 and 5, as shown in FIGS. 1 and 3, or a single hinge 6, as shown in FIG. 6.

In accordance with the invention, a door locking device is provided on the housing 1 or 1' at the door 3 or 3'. The door locking device comprises a pair of parallel guide rods 7 and 8 (FIGS. 1 and 5). Each of the parallel guide rods 7 and 8 is mounted on the housing on opposite sides of the opening 2. In the embodiment of FIGS. 1 to 5, a slide rod 11 is movably confined by the rods 7 and 8 and extends across the opening 2. Thus, when the door 3 is open, it supports the slide rod 11, and when the door closes, the slide rod slides down and bars the door.

In the embodiment of FIGS. 6 to 10, slide rods 9 and 10 extend across the opening 2'. Thus, when the door 3' is open, it supports the slide rods 9 and 10 and when the door closes, the slide rods slide down and bar the door. A pair of substantially parallel guide slots 13 and 14 (FIG. 6) are formed through the housing 1, on opposite sides of the opening 2'. The slide rods 9 and 10 are substantially parallel and are slidably mounted for movement up and down on opposite sides of the door. The slide rods 9 and 10 are affixed to each other at the slots 13 and 14.

The door 3 or 3' may open either outward from the housing or into the housing. A triggering device 12 coupled to the door 3 holds bait in the housing 1 and closes the door when the bait is taken. A triggering device 12' (FIG. 9) coupled to the door 3' holds bait in the housing 1' and closes the door when the bait is taken.

While the invention has been described by means of specific examples and in specific embodiments, I do not wish to be limited thereto, for obvious modifications will occur to those skilled in the art without departing from the spirit and scope of the invention.

I claim:

1. A door device for a door hingedly affixed to a housing for covering an opening thereof, said door being affixed to the housing at the top of the door, said door device comprising door locking means on the housing at the door, said door locking means comprising a pair of substantially parallel guide slots formed through the housing on opposite sides of the opening and a pair of substantially parallel slide rods slidably mounted for movement up and down on opposite sides of the door, said slide rods being affixed to each other at the slots and extending across the opening whereby when the door is open it supports the slide rods and when it closes, the slide rods slide down and bar the door.

2. A door device as claimed in claim 1, wherein the door opens inward and outward from the housing.

3. A door device for a door hingedly affixed to a housing for covering an opening thereof, said door being affixed to the housing at the top of the door, said door device comprising door locking means on the housing at the door, said door locking means comprising a pair of substantially parallel guide slots formed through the housing on opposite sides of the opening and a slide rod slidably mounted in the slots for movement up and down on one side of the door and extending across the opening whereby when the door is open it supports the slide rod, and when it closes, the slide rod slides down and bars the door.

* * * * *